No. 707,939. Patented Aug. 26, 1902.
C. H. PASCHKE.
ARMOR FOR VEHICLE TIRES.
(Application filed Feb. 26, 1902.)
(No Model.)
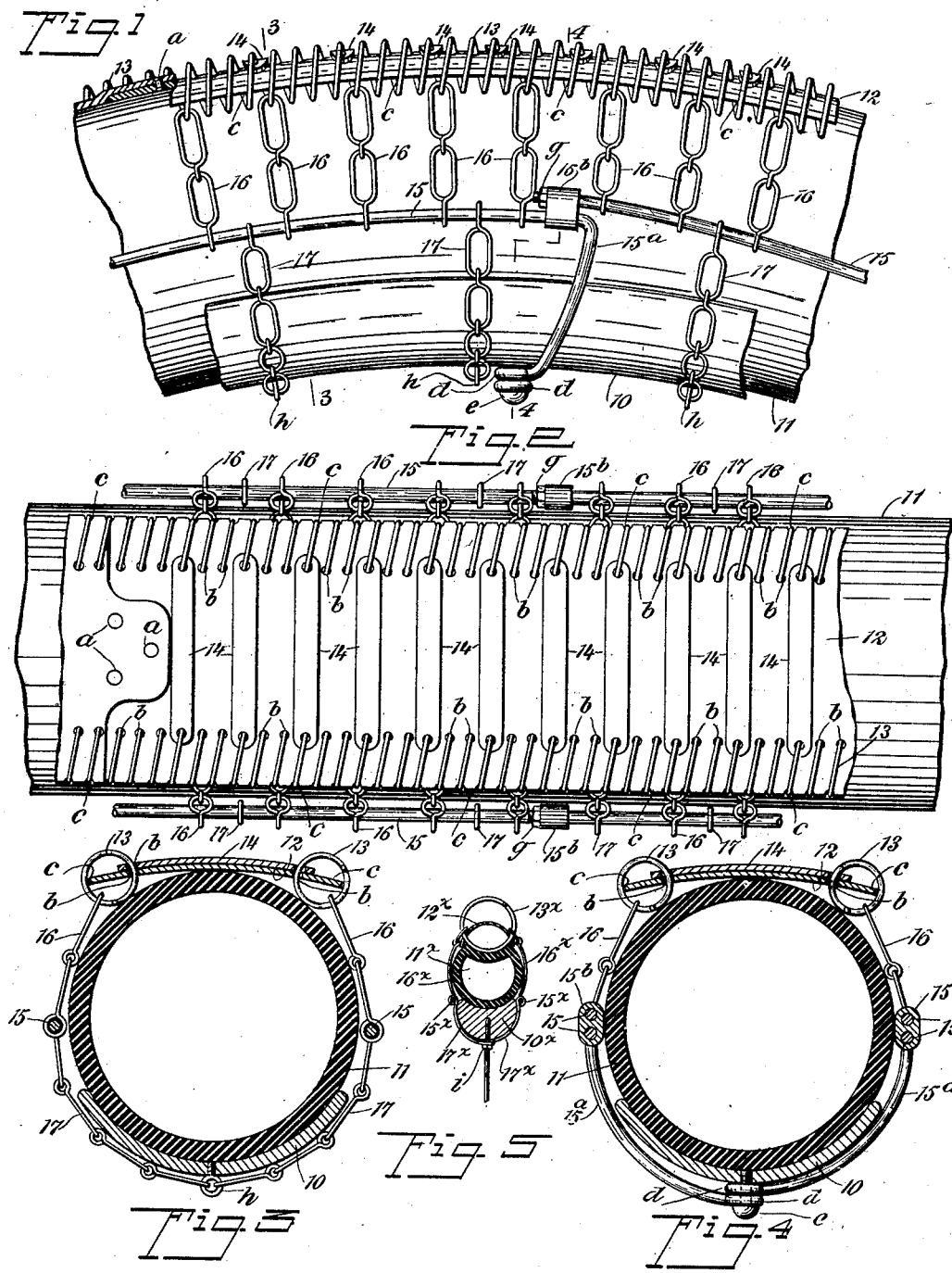
WITNESSES:
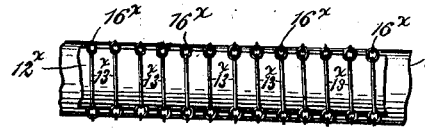
INVENTOR
Charles H. Paschke
BY
ATTORNEYS

UNITED STATES PATENT OFFICE.

CHARLES HERMEN PASCHKE, OF BUFFALO, NEW YORK.

ARMOR FOR VEHICLE-TIRES.

SPECIFICATION forming part of Letters Patent No. 707,939, dated August 26, 1902.

Application filed February 26, 1902. Serial No. 95,713. (No model.)

*To all whom it may concern:*

Be it known that I, CHARLES HERMEN PASCHKE, a citizen of the United States, and a resident of Buffalo, in the county of Erie and State of New York, have invented a new and Improved Armor for Vehicle-Tires, of which the following is a full, clear, and exact description.

The object of this invention is to provide an inflatable tire for vehicles with a novel protective armor which is light, strong, and durable, which will afford increased bite or frictional contact with a road-bed, thus preventing slipping of the wheels having the improvement, and which is adapted for use on heavy automobiles, road-wagons, carriages, or bicycles.

The invention consists in the novel construction and combination of parts, as is hereinafter described, and defined in the appended claims.

Reference is to be had to the accompanying drawings, forming a part of this specification, in which similar characters of reference indicate corresponding parts in all the figures.

Figure 1 is a side view in part of a vehicle-tire having the improvements. Fig. 2 is a plan view of the same. Fig. 3 is a transverse sectional view substantially on the line 3 3 in Fig. 1. Fig. 4 is a transverse sectional view substantially on the line 4 4 in Fig. 1. Fig. 5 is a reduced transverse sectional view of the invention as applied to a bicycle or other light vehicle wheel, and Fig. 6 is a plan view of the modified construction shown in Fig. 5.

In Figs. 1 to 4, inclusive, 10 represents a portion of a wheel-rim, either of wood or metal, and that may be part of the running-gear of an automobile or other vehicle. In the outer concave side of the rim 10 a pneumatic tube 11 is seated that is shown in part, but in complete form is an endless gum tire-ring. Obviously the tubular ring 11 must be proportioned in thickness of its wall to adapt it to sustain a heavy weight and have such internal diameter as a ring to adapt it to fit loosely upon the wheel-rim 10. An armor-ring 12, which is an important feature of the improvements, is formed of plate metal and may be channeled, but preferably is flat, and to facilitate manufacture the plate-metal strip composing the armor-ring may be rolled into proper form first—that is, bent as a ring—and subsequently lapped at the ends and secured together at said lap by rivets $a$. Near each side edge of the armor-ring 12 a row of spaced perforations $b$ is formed, and in said edges notches $c$ are formed. In each of the rows of holes $b$ and in the corresponding series of notches $c$ a spring-wire coil-ring 13 is introduced, and thus held interlocked with the armor-ring, the ends of each ring being secured together in any preferred manner, so that after engagement with the armor-ring at its edges each coil-ring is rendered practically continuous and firmly positioned on the armor-ring. As indicated, the armor-ring 12 is mounted on the tubular ring 11 when these parts are to be assembled, which may be readily effected by partially inflating the tubular ring, then placing the armor-ring thereon, and subsequently completing the inflation, the fully-distended gum ring 11 then having enforced engagement with the inner side of the armor-ring, as clearly represented in Figs. 3 and 4, and it will be seen in said figures that when in place the spring coil-rings 13 are disposed, respectively, near each side of the pneumatic ring 11 and have contact therewith. At suitable intervals the spring coil-rings 13 are connected together by the tread-plates 14, which are of similar form, and each consists of a nearly flat strip of preferably hardened metal having a perforation near each end. In arranging the tread-plates 14 they are engaged by the spring coil-rings 13, that have their wire bodies screwed through the perforations in the ends of said plates, and the latter are spaced apart evenly, their disposal as described permitting them to seat upon the armor-ring 12, that in service is reinforced by the tread-plates, and, if desired, the tread-plates may be riveted upon the armor-ring. Two similar tension-rings 15 are details of the improvements, each consisting of a wire rod bent circular and joined together near its ends, as will presently be described. The rings 15 exceed in diameter that of the wheel-rim 10, but have less diameter than the coil-rings 13, the relative position given to the tension-rings disposing them at each side of the tubular ring 11 near its center, as shown best in Fig. 3. Near one end of the wire strand forming each tension-ring 15 an arm 15ª is bent laterally thereon, having such length as will permit these arms to be curved downward and then toward each other beneath the wheel-rim 10. Each free end of the similar arms 15ª has a ring-eye $d$ formed on it, and when the rings 15 are placed in position the ring-eyes are seated one upon the other and both upon the wheel-rim at its transverse center, a screw-bolt $e$, that passes through both ring-eyes and into the wheel-rim, serving to secure the arms of the tension-rings upon said rim, as clearly shown in Figs. 1 and 4. A coupling-block 15ᵇ is mounted upon the body of each tension-ring 15 near the angular bend where the arm 15ª is projected laterally therefrom, these similar coupling-blocks each consisting of a metal billet having two spaced perforations formed in it to receive the adjacent end portions of the tension-ring. Upon the end portion of each tension-ring 15 that is straight and which passes loosely through one of the perforations in the complementary coupling-block 15ᵇ a screw-thread is formed and a nut $g$ screwed thereon, whereby the respective ends of the tension-rings are practically connected together, as indicated in Fig. 1. From the tension-rings 15 a plurality of spaced pliable connections 16 extend toward the coil-rings 13 and are thereto connected, these pliable connections being preferably in the form of short chains having such length as will permit the tension-rings to hang at each side of the tubular ring 11, as shown in Figs. 1, 2, and 3 of the drawings. Flexible connections 17 are spaced apart and engaged by one end of each one with each tension-ring 15 and thence are drawn taut down and around the wheel-rim 10, their lowermost ends being attached upon the wheel-rim at its center of width by suitable bolts $h$, as shown in Fig. 3. The chain connections 16 and 17 are so proportioned in length as will adapt them to be drawn taut and hold the armor-ring 12, together with the coil-rings 13, closely engaged with the tubular ring 11 when the latter is completely inflated.

It will be evident that the improved appliances for a pneumatic tire will provide a light resilient armor therefor which will bite upon the road-bed, so as to prevent slipping of the wheels and greatly increase the durability of the inflatable tire. It should be explained that the provision of the arms 15ª and their attachment upon the wheel-rim 10 prevents the tension-rings 15 from rotating independently of the wheel-rims, and as the ends of the chains 16 17 may with advantage be secured upon the tension-rings, so as to prevent them from changing position thereon, it will be obvious that the plate-metal armor-ring and its attachments will be held to rotate with the wheel of which the rim 10 is a portion.

In Figs. 5 and 6 the device is represented in slightly-modified form to adapt the same for use on a bicycle-wheel or the wheels of other light vehicles. In this construction the armor-ring $12^\times$ is reduced in width and has notches formed in its edges to receive and hold a single continuous coil-ring $13^\times$, that is seated upon the tubular pneumatic ring $11^\times$, which in turn seats on the wheel-rim $10^\times$. The single coil-ring $13^\times$ is connected by the pliable chain-links $16^\times$ to the tension-rings $15^\times$ and also by the similar connections $17^\times$ to the wheel-rim $10^\times$ by means of bolts $i$ or the like. It will be seen that in this adaptation of the improved armor the coil-ring $13^\times$ becomes the tread of the tire and serves to bite upon the road-bed, so as to prevent slipping, while the parts that connect it with the wheel-rim are rendered stable by inflation of the pneumatic tire-ring $11^\times$, so that the construction and operation of the modified form is similar to that previously described.

Having thus described my invention, I claim as new and desire to secure by Letters Patent—

1. The combination with a wheel-rim, and a tire-ring, of an armor-ring mounted upon the periphery of the tire-ring and provided with notches in its edges, a wire coil-ring seated on the tire-ring and engaging the notches of the armor-ring, and means secured to the wheel-rim and engaging the coil-ring for securing the latter to the former.

2. The combination with a wheel-rim, and a tire-ring, of an armor-ring mounted upon the periphery of the tire-ring, a spring coil-ring held on each edge of the armor-ring and seated on the periphery of the tire-ring, one at each side of the center thereof and means secured to the wheel-rim and engaging the coil-rings for holding the latter in position on the former.

3. The combination with a wheel-rim, and a tire-ring thereon, of a plate-metal armor-ring seated upon the tire-ring and having perforations and notches at each edge thereof, coil-rings held in the perforations and notches of the armor-ring and engaging the periphery of the tire-ring, and means for securing the armor-ring to the wheel-rim.

4. The combination with a wheel-rim, an inflatable tire-ring seated upon the wheel-rim, an armor-ring on the tire-ring, and coil-rings held in perforations and notches at the sides of the armor-ring so as to seat upon the tire-ring, of tension-rings secured upon the wheel-rim and disposed at opposite sides of the tire-ring, flexible connections extended between the tension-rings and the coil-rings, and flexible connections extended from the tension-rings beneath the wheel-rim and secured thereto.

5. The combination with a wheel-rim, an inflatable tire-ring seated upon the wheel-rim, a plate-metal armor-ring mounted upon the tire-ring, two coil-rings held at the side edges of the armor-ring, and spaced tread-plates having their ends engaged with the coil-rings and seating upon the armor-ring, of two tension-rings disposed oppositely at the sides of the tire-ring, arms extended from the tension-rings beneath the wheel-rim, means for securing the ends of said arms upon the wheel-rim, pliable connections extended between the coil-rings and the tension-rings, and pliable connections extended from the wheel-rim to the tension-rings.

6. The combination with a wheel-rim, and a tire-ring, of tension-rings arranged on opposite sides of the tire-ring and each having an arm extending therefrom, said arms extending beneath the wheel-rim and secured thereto.

7. In a device of the character described, the tension-rings, arranged on opposite sides of the tire-ring, each tension-ring having its ends held together by a coupling-block, and each provided with a lateral arm which projects beneath and is secured to the wheel-rim.

8. In a device of the character described, a plate-metal armor-ring having perforations and notches in each edge, and a coil wire-ring on each edge of the armor-ring, the coils of the wire ring being passed through the perforations and seated in the notches of the armor-ring.

9. In a device of the character described, the wire coil-rings held interlocked with the side edges of the plate-metal armor-ring, and the spaced tread-plates having perforations in their ends which receive the coils of the wire coil-rings.

10. An armor for vehicle-tires, comprising an armor-ring, a coil-ring on each edge of the armor-ring, transverse tread-plates on the outer face of the armor-plate, and means for securing the armor-plates to the wheel-rim, as set forth.

11. An armor for vehicle-tires, comprising an armor-ring, tread-plates on the outer face of the armor-ring, a coil-ring on each edge of the armor-ring and securing the tread-plates to the armor-ring, oppositely-arranged tension-rings secured to the wheel-rim, and connections between the tension-rings and the coil-rings of the armor-ring, as set forth.

12. An armor for vehicle-tires, comprising an armor-ring, tread-plates on the outer face of the armor-ring, a coil-ring on each edge of the armor-ring and securing the tread-plates in position, oppositely-arranged tension-rings secured to the wheel-rim, flexible connections between the tension-rings and the coil-rings and flexible connections between the wheel-rim and tension-rings, as set forth.

13. In an armor for vehicle-tires, an armor-plate provided with notches in its edges and openings near said edges, coil-rings engaging the openings and notches of the armor-ring, and transversely-extending tread-plates on the armor-ring and having openings in their ends to receive the coils of the said rings, as set forth.

In testimony whereof I have signed my name to this specification in the presence of two subscribing witnesses.

CHARLES HERMEN PASCHKE.

Witnesses:
ULYSSES S. THOMAS,
ORSON J. WEIMERT.